Figure 1:
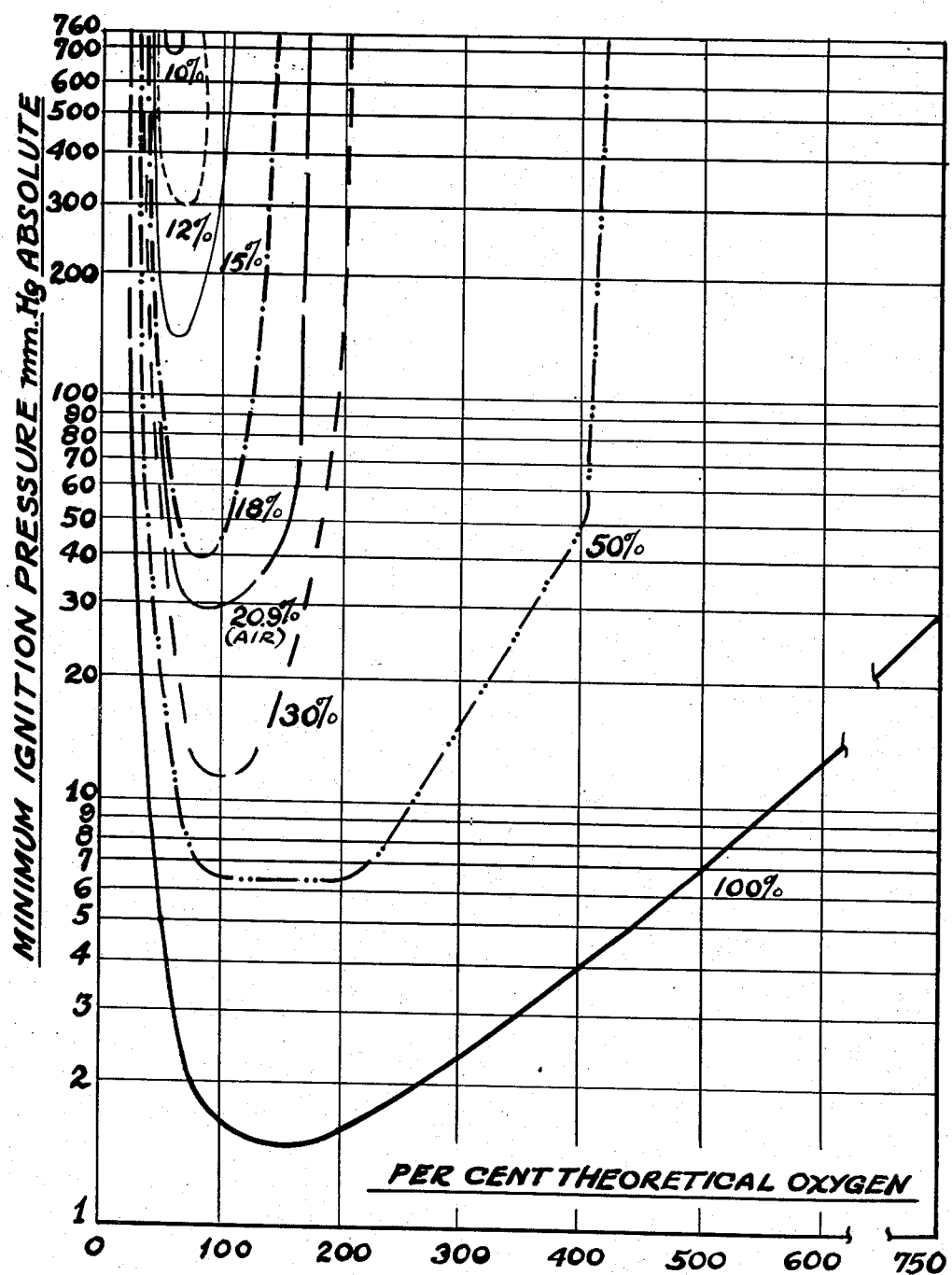

UNITED STATES PATENT OFFICE 2,651,173

PROCESS AND APPARATUS FOR OPERATING ENGINES AT HIGH ALTITUDES

Herman L. Thwaites, Clark Township, Union County, and Barrett B. Russell 3rd, Elizabeth, N. J., assignors to Standard Oil Development Company, a corporation of Delaware Application January 26, 1949, Serial No. 72,972

8 Claims. (Cl. 60—39.06)

This invention relates to an improved process of operating an engine at reduced atmospheric pressures. The invention is of particular application to improving the operation of gas turbine engines and ram jet engines at high altitudes. In accordance with this invention, an auxiliary supply of oxygen is provided which is utilized to provide oxygen to the combustion chamber to initiate combustion at high altitudes, in the event normal operation of the engine has been discontinued for any reason and it is necessary to restart the engine.

At the present time one of the most promising developments in aviation power supplies is the advent of gas turbine and ram jet engines. These engines are operated by burning a suitable fuel in a combustion zone under a compression ratio of about 2 to 1 to 5 to 1 or higher. It is a characteristic of these engines that if combustion is discontinued in the engine, the compression ratio drops to that provided by existing atmospheric pressures or a ratio of 1 to 1. In the case of the gas turbine engine, this occurs since the necessary compression to provide the indicated compression ratios are provided by a compressor operated by a turbine driven by the exhaust gas of the engine. Consequently, when combustion is discontinued the turbine ceases to operate so as to sharply drop the compression ratio. Similarly, in the case of the ram jet engine the necessary compression is developed by the speed of the aircraft through the air. As this speed is ordinarily above the speed of sound, when combustion in the engine is stopped the speed of the plane drops extremely rapidly so that the necessary compression is rapidly cut-down. Consequently, in the case of both the gas turbine engine and the ram jet engine, if combustion is stopped, due to the consequent drop in the compression ratio of the engine, it is ordinarily extremely difficult to restart the engine.

The problem of restarting the engines of the type indicated is further aggravated by the low air pressure existing at the high altitudes at which aircraft using these engines are generally operated. Thus, for example, let it be assumed that an airplane is operating at an altitude such that the atmospheric pressure is approximately 4" of mercury, and that the airplane is operating at a compression ratio of 5 to 1. These conditions consequently result in a combustion zone pressure of 20" of mercury. In the event combustion is discontinued in the engine, as indicated, the compression ratio will rapidly drop to substantially 1:1 so that the pressure in the combustion zone will drop to about 4" of mercury. At such a low pressure it may be impossible to reignite the fuel in the combustion zone for lack of the proper ignition conditions. Consequently, combustion could only be reinitiated at a time when the airplane has fallen to a lower altitude at which the atmospheric pressure is sufficiently high to support combustion. It is, therefore, to be seen that the indicated difficulties arising from the drop in compression ratio upon discontinuance of combustion in engines of this type is aggravated by the factor of low atmospheric pressures at high altitudes. The combination of these two factors imposes a very real problem in initiating the combustion of fuels in a gas turbine or ram jet engine at high altitudes. This problem is particularly critical in view of the present tendency of fuels for such engines to periodically fail to burn. This phenomenon is known as high altitude blow-out. High altitude blow-out is principally due to changes in operating conditions such as, for example, a change in the throttle setting at a particular altitude. Such a change is frequently effective in temporarily upsetting combustion conditions so as to permit the flame in the combustion zone to die out. The problem is in part due to the type of fuel used in these planes as some fuels are more subject to the possibility of high altitude blow-out than other fuels.

Heretofore, the principal approach to the problem of solving the difficulties of high altitude blow-out has been to improve the quality of the fuel used. In this connection it has been discovered that certain fuels such as propylene oxide and hydrazine produce flames which are more stable than that produced by the combustion of petroleum hydrocarbons. While it may be that the problem of high altitude blow-out could to some extent be alleviated by employing such fuels, this approach to the problem is unattractive due to the expense of such fuels. Furthermore, from a standpoint of over-all supply, it is apparent that use of a premium fuel of this general type is seriously limited by the availability of suitable supplies. Consequently, it is highly desirable to provide a means of eliminating the problems of high altitude blow-out without the necessity for resorting to an unusual type of fuel.

As indicated, therefore, it is the principal object of this invention to overcome the problem of reinitiating combustion in an engine operated at high altitudes without the necessity for resorting to a special fuel.

It is a further object of this invention to provide means to facilitate the initiation of combustion in an engine at high altitudes. A more specific object of this invention is to provide a suitable process and apparatus for successfully reigniting conventional fuels in gas turbine and ram jet engines at high altitudes.

In accordance with this invention, it has been found that critical ignition limits exist which determine the fuel ratios and combustion pressures which must obtain in order to support ignition at high altitudes. Thus, it has been discovered that at certain altitudes a sharply critical fuel to air ratio must exist in order that combustion may be initiated. Again, it has been discovered that at certain altitudes initiation of combustion is impossible utilizing air. As a result of these discoveries it has been ascertained that both of these limitations may be substantially overcome by the partial replacement of air with oxygen. In accordance with these discoveries a process and apparatus is herein disclosed suitable for supplying a stream of oxygen to the combustion zone so as to facilitate the ignition of combustion at high altitudes.

Figure 2:
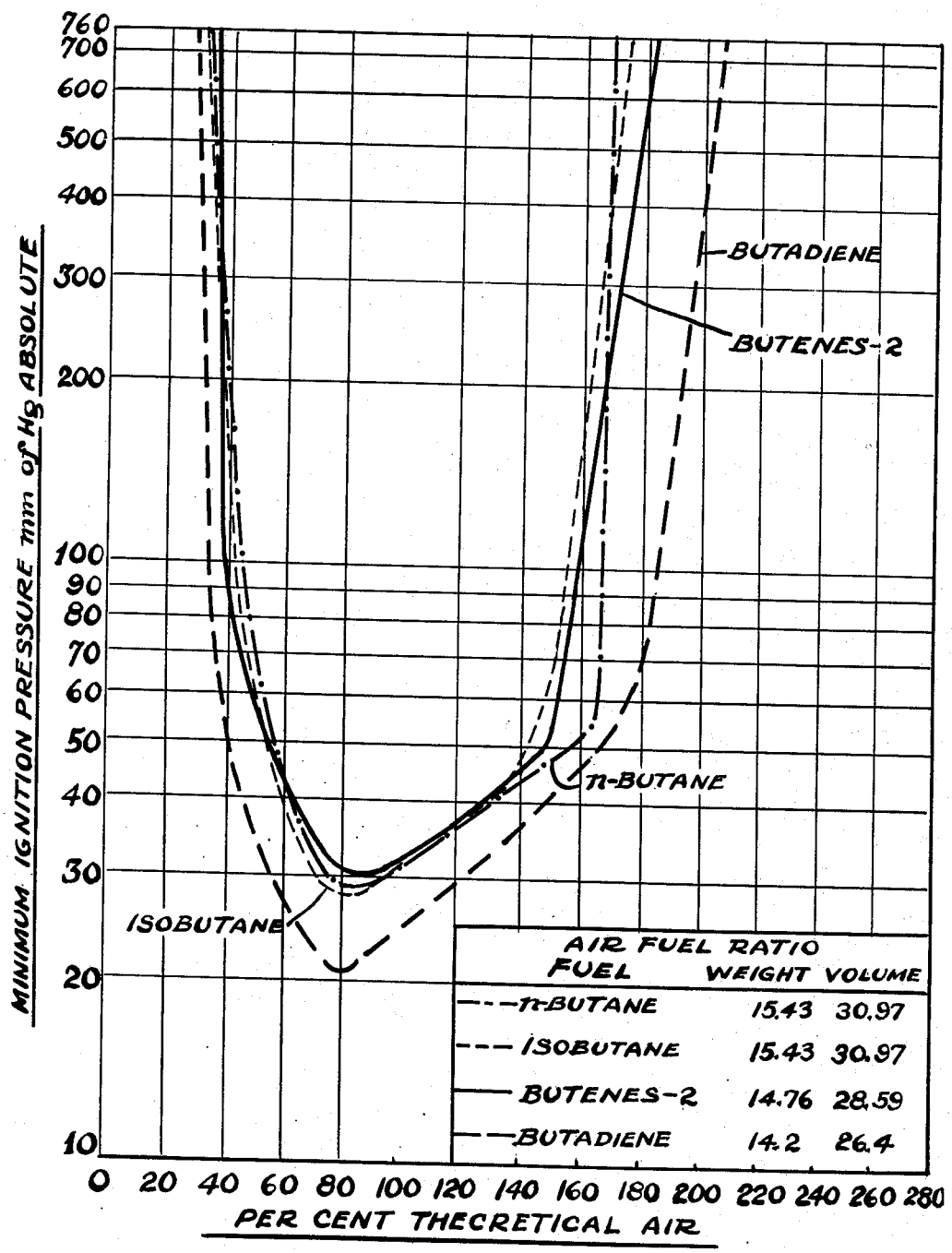
Figure 3:
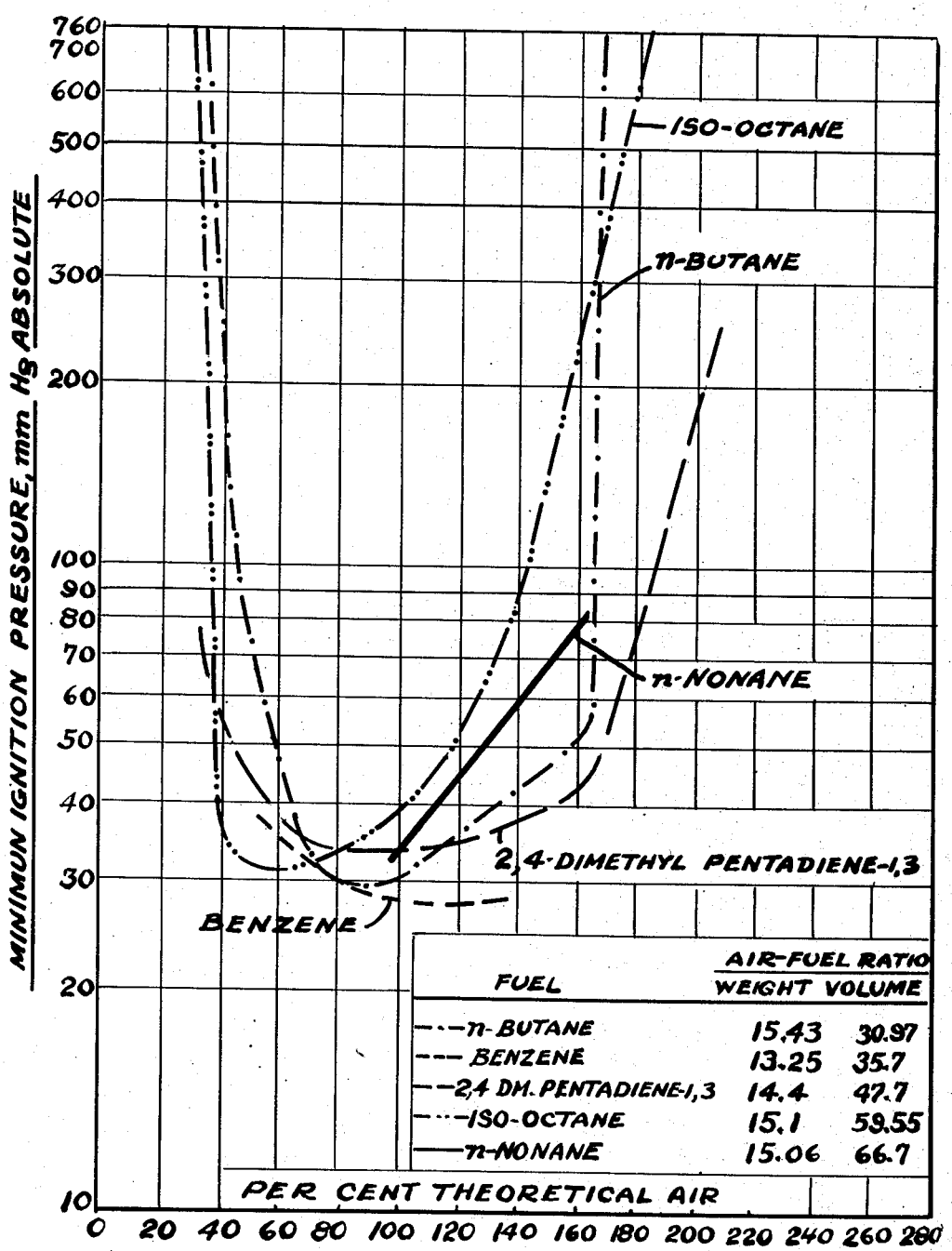
Figure 4:
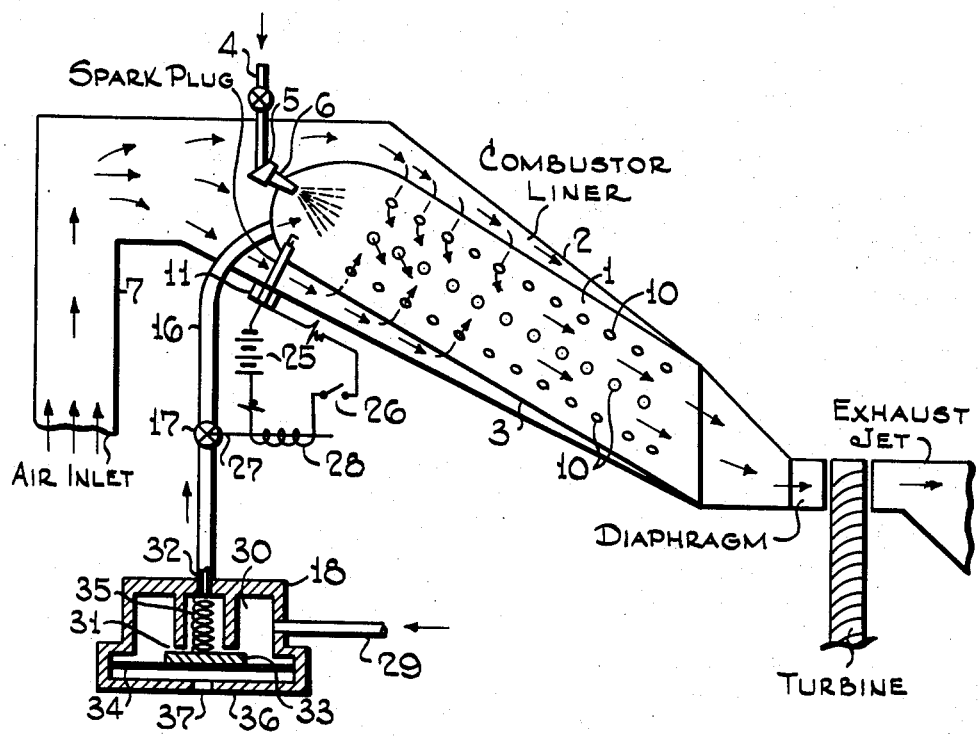

The nature of this invention will be fully understood from a consideration of the following description relating to the accompanying drawings in which:

Figure 1 shows the critical ignition limits of a butane-oxygen-nitrogen system and;

Figure 2 similarly represents the combustion limits of C4 hydrocarbons generally and;

Figure 3 similarly represents the ignition limits of liquid hydrocarbons and;

Figure 4 diagrammatically illustrates the application of this invention to a gas turbine engine.

In order to understand the nature of Figures 1, 2, and 3 of the drawings, it is necessary to appreciate the method employed in determining the ignition limits plotted. In order to determine these ignition limits an apparatus was used which simulated the actual operating conditions of a spark ignition engine at high altitudes. The apparatus consisted essentially of a suitable system for blending hydrocarbon fuel with air in the desired proportions and at the desired pressure, together with an ignition vessel in which combustion was initiated by means of a spark-plug. The system for blending the hydrocarbon fuel with air consisted of a two liter glass flask which was equipped with a solenoid actuated glass plunger operated to thoroughly agitate the fuel-air mixture. Suitable mercury manometers were attached to the mixing flask to permit accurately measuring the proportions of fuel and air blended. The mixing chamber was connected with a three liter flask equipped with a spark-plug to act as an explosion bomb. The spark-plug employed was a commercial aviation gas turbine spark-plug (Bendix 10-52630-1). In order to eliminate any variation in the firing characteristics of this spark-plug, a suitable high frequency sparking ignition circuit was used to fire the spark-plug. This circuit consisted of a Scintilla high frequency spark apparatus manufactured by the Scintilla Magneto Division of the Bendix Aviation Corp. in Sidney, New York. This apparatus was used so as to periodically supply the spark-plug with a suitable amount of energy. It was found that a capacitance of 48 microfarads charged by a potential of 600 volts was sufficient to overcome any energy limitations placed on ignition by the spark-plug.

In utilizing the apparatus described, a hydrocarbon sample was first introduced into the evacuated mixing flask. The flask was then evacuated again and this procedure was repeated several times, after which sufficient hydrocarbon sample was permitted to remain in the flask to give a predetermined pressure due only to the presence of the hydrocarbon. Air which had been thoroughly dried by suitable chemical treatment was then introduced into the mixing flask in an amount sufficient to give the desired mixture strength. The hydrocarbon sample-air mixture was then agitated in the flask for a period of ten minutes which was established to be sufficiently long to thoroughly mix the hydrocarbon-air samples. The sample of hydrocarbon-air mixture was then introduced into the evacuated explosion bomb in sufficient quantity to provide the desired pressure in the bomb. The spark current was then applied providing an ignition spark at a frequency of about 5 per second for a period of 5 seconds or less. In the event the hydrocarbon-air mixture ignited the occurrence of ignition was indicated by the appearance of a flame in the bomb and by an increase in pressure in the bomb. It was found that the pressure indication of ignition was a more positive means of identifying ignition than the appearance of a flame since a rapid movement of the mercury column of a suitable manometer attached to the explosion bomb always occurred on ignition and could be readily detected. In order to determine critical ignition limits for particular fuel-air mixtures at varying pressures, the ignition limit was determined from a consideration of both the minimum pressure at which the blend could be ignited and the maximum pressure at which it would not ignite. In other words, in considering a particular blend, the ignition limit of samples of the blend was determined by working towards this limit from both the high pressure side and the low pressure side. Sufficient tests were conducted so that these two points were determined within two to three millimeters of mercury pressure of each other. The value which was then selected as representing the ignition limit of the particular fuel composition was the average of the indicated two points.

Referring first to Figure 1 of the drawing, it will be noted that curves are presented showing the ignition limits of butane-oxygen-nitrogen mixtures. The ignition limits are plotted against pressure and per cent theoretical oxygen, employing the volume per cent of oxygen in oxygen-nitrogen blends as parameters. In other words, curves are presented showing the ignition limit envelopes of various oxygen-nitrogen-butane blends plotted against the minimum ignition pressure and the per cent theoretical oxygen. The ordinate of the curve illustrated in Figure 1 is indicated to be in millimeters of mercury absolute, the top of the curve illustrating sea level operation, 760 millimeters mercury absolute. The abscissa of the curve of Figure 1 represents the amount of oxygen in the mixture in terms of the per cent of oxygen required to stoichiometrically react with the fuel present. Therefore, points below 100% theoretical oxygen represent fuel-oxygen-nitrogen mixtures having insufficient oxygen to completely react with the fuel, while points above 100% represent fuel-oxygen-nitrogen mixtures having an excess of oxygen over the amount required to react with the fuel. In understanding the data plotted in Figure 1, it is necessary to appreciate that all points falling below or outside the ignition envelopes for a particular butane-oxygen-nitrogen mixture indicate that ignition cannot be initiated. Similarly, all points falling within the envelopes of a particular butane-oxygen-nitrogen mixture are indicative of conditions suitable for permitting ignition. Thus, for example, it will be noted that the minimum ignition pressure for a butane-oxygen-nitrogen mixture in which the per cent of oxygen in the oxygen-nitrogen blend is 12%, is somewhat less than 300 millimeters of mercury absolute. In this connection it should further be noted that ignition of such a mixture at a pressure of about 300 millimeters of mercury absolute is only possible when a critical per cent of theoretical oxygen is present. Thus, for example the mixture indicated can not be ignited in the presence of 100% theoretical oxygen nor can it be ignited in the presence of 50% theoretical oxygen. Consequently, the information to be derived from the curves of Figure 1 is that for each butane-oxygen-nitrogen mixture having a given percentage of oxygen in the blend, critical conditions of ignition pressure exist and critical conditions of per cent theoretical oxygen exist. As a further example, in considering the ignition envelope for a mixture of butane-oxygen and nitrogen in which the oxygen in the oxygen to nitrogen blend is 20.9%, corresponding to air, it will be seen that the minimum ignition pressure of this mixture is at a pressure of about 29 millimeters of mercury absolute. It will further be seen that at this pressure the fuel-oxygen ratio is critically set at about 80% of the theoretical oxygen requirements of the fuel, as any other combination of fuel-oxygen ratios would not permit ignition at pressures below 29 millimeters of mercury. It will be seen that by employing somewhat higher ignition pressures, such as for example, a pressure of 100 millimeters of mercury, that the tolerable ratios of oxygen to fuel in the blend may be extended, making possible the ignition of blends of butane and air above 100 millimeters of mercury from about 40% to 170% of the theoretical oxygen requirements. It is still notable, however, that the fuel to air ratio as indicated by the per cent theoretical oxygen requirements is rather critically limited.

The significance of this information may best be appreciated by comparing the data relating to an air-blend with the data showing utilization of 100% oxygen. It will be seen that the minimum ignition pressure of a butane-oxygen system is about 1.5 millimeters of mercury. It will furthermore be seen that even at such relatively low pressures as 3 millimeters of mercury, the tolerable butane to oxygen ratio extends from approximately 70% theoretical oxygen to about 350%. Again, for the sake of comparison with the air envelope heretofore discussed, it is notable that at an ignition pressure of 30 millimeters of mercury, an oxygen-butane blend can be ignited within the ranges of about 30% to 750% of the theoretical oxygen requirements. This is in sharp contrast to the condition existing in an air-butane blend which, as indicated, can only be ignited at 30 millimeters mercury pressure within the narrow limits of 72% and 100% theoretical oxygen. It is therefore to be seen from the curves of Figure 1 that the ignition of butane is possible at markedly lower ignition pressures provided the concentration of oxygen employed is increased beyond that available in air. Furthermore, it is to be seen that broader tolerances of butane to per cent theoretical oxygen may be appreciated for a given pressure provided air used to support the combustion is enriched with oxygen or is completely displaced by oxygen.

It will now be possible to readily appreciate the significance of Figures 2 and 3 of the drawing. These drawings similarly represent the critical ignition limits of fuel-air mixtures of hydrocarbons other than the normal butane illustrated in Figure 1. For comparative purposes the butane-air blend of Figure 1 is also reproduced in Figures 2 and 3, although it will be noted that the scales employed in plotting this information are somewhat different.

In examining the data of Figures 2 and 3, it will be seen that ignition envelopes are given for normal butane, isobutane, butenes-2, butadiene-1,3, benzene, 2,4-dimethyl pentadiene-1,3, iso-octane and normal nonane. Each of these hydrocarbons were obtained in purities greater than 99% to obtain the data plotted. It will be noted that each of the different types of hydrocarbons tested had substantially the same ignition envelope as normal butane formerly considered in the curves of Figure 1. It will be noted that incomplete envelopes are indicated on the drawings for normal nonane and for benzene. This was due to the fact that experimental limitations imposed by the equipment used prevented obtaining complete envelopes for these compounds. In critically examining the curves of Figures 2 and 3, it will be seen that in comparing butadiene with normal butane it appears that the diolefin is capable of supporting ignition at somewhat lower ignition pressures. However, in considering a larger molecular weight diolefin, such as 2,4-dimethyl pentadiene,1,3, it will be seen that this apparent trend in lowering the minimum ignition pressure is offset by the larger molecular weight of the diolefin. It is significant in regard to the curves of Figures 2 and 3, that the ignition envelopes established in Figure 1 appear to be representative of those encountered with any hydrocarbon fuel. While the particular type of hydrocarbon fuel or the particular mixture of hydrocarbons employed would be expected to vary the ignition envelope somewhat, it would appear that the ignition envelopes would substantially correspond to those indicated in Figure 1. It is therefore to be seen that the basic principles derived from Figure 1 relative to the utilization of oxygen-enriched air are generally applicable to hydrocarbon fuels.

In accordance with the principles derived herein, it is contemplated that an improved manner of initiating combustion in an engine utilizing a hydrocarbon fuel is to oxygen-enrich the combustion zone. While it is particularly contemplated that the air normally used to initiate combustion should be completely replaced with oxygen, it is within the scope of this invention to simply enrich the air with oxygen. Suitable apparatus to carry out this process is indicated in Figure 4 of the drawings.

Referring to Figure 4, the numeral 1 generally identifies a combustion zone as employed in a gas turbine engine. The combustion zone consists of an external shell 2 annularly placed around an internal combustion chamber liner 3. Fuel is introduced into the combustion zone through fuel line 4, fuel filter 5 and fuel nozzle 6, so as to spray the fuel into one end of the combustion zone within the combustion chamber liner. Air to support the combustion of the fuel is introduced through the air line 7 so as to provide a stream of air eventually entering the combustion chamber liner through the perforations 10. A spark-plug 11 is positioned within the combustion liner adjacent the fuel spray nozzle. For the purposes of clarity it may be stated that the area within the combustion liner closely adjacent the spark-plug and fuel spray nozzle is the primary combustion zone. It is within this zone that combustion is initiated on sparking of the spark-plug when suitable ratios of oxygen and fuel are contained in the primary combustion zone under suitable pressures. In accordance with this invention, an auxiliary oxygen supply is utilized to supply a stream of oxygen through line 16 into the primary combustion zone closely adjacent the spark-plug and fuel spray nozzle. In accordance with this invention in order to initiate combustion in the primary combustion zone under lower combustion pressures or at less critical fuel-oxygen mixtures, oxygen is supplied through line 16 whenever the spark-plug is energized. To accomplish this, it is suitable to position an electrically controlled valve in the oxygen line 16 in conjunction with the electrical circuit of the spark-plug. A suitable valve mechanism of this character is diagrammatically illustrated in Figure 4 of the drawings. The spark plug 11 is connected in an electrical circuit including a power source for the spark plug 25 and a switch 26. This electrical circuit also includes connections to a solenoid operated valve 17 having an actuating member 27 positioned in the field of a solenoid coil 28 which is connected in the electrical circuit of the spark plug. The solenoid valve 17 may be of conventional nature of the character normally closed. Consequently, when a current is supplied to the spark-plug valve 17 in the oxygen line will be opened to simultaneously supply a stream of oxygen to the primary combustion zone. While, it is contemplated that this invention is of application to the initiation of combustion at any altitude, it is particularly contemplated that the invention should be employed at altitudes above 10,000 ft. or in other words, under conditions such that the air pressure existing is less than 518 millimeters of mercury. In this application of the invention, restarting an engine after blow-out has occurred may be accomplished more readily by virtue of the stream of oxygen supplied as indicated. In this specific application of the invention it is particularly proposed that an auxiliary valve 18 should be positioned in the oxygen line which may be controlled by the atmospheric barometric pressure existent at a particular altitude. A valve of this type may be a pressure operated valve which is set to open at pressures of 518 millimeters of mercury or lower. A suitable valve of this type is diagrammatically illustrated in the drawings. As illustrated, the valve 18 is provided with an inlet conduit 29 entering into a chamber 30 which has connection through a port 31 to an exit conduit 32. A valve closure member 33 is maintained adjacent port 31 by means of the resilient diaphragm 34 to which the valve closure member is fixed. The diaphragm 34 thus acts to normally hold closure member 33 over port 31 to prevent passage of fluid through the valve mechanism. A spring 35 is positioned to urge the diaphragm and the closure member 33 away from the valve port. The valve head 36 on the opposite side of this diaphragm is provided with an air vent 37 opened to the atmospheric pressure at which the engine is operated. The force of spring 35 acting against diaphragm 34 is thereby counterbalanced at least in part by atmospheric pressure acting on the opposite side of the diaphragm. This valve may be so designed that atmospheric pressure above values of about 518 millimeters of mercury will maintain the valve in the closed position. However, at pressures lower than this or any other selected value, spring 35 may be operative to open the valve permitting flow of fluid through the auxiliary oxygen line 16 to the combustion zone. While the utilization of a pressure operated valve in the oxygen line constitutes a preferred embodiment of this invention, it is to be understood that this invention is not to be limited thereto. For example, it is contemplated that utilization of a stream of oxygen to the primary combustion zone during ignition will be of application to ram jet engines to permit initiation of combustion at lower speeds than heretofore possible. Similarly this invention is not limited to spark ignition engines but is applicable as well to engines ignited by the injection of a flammable substance such as $KMnO_4$ plus $H_2O_2$ or hydrazine. While the invention is not restricted to application with fuels of any particular type, it is thought the invention is particularly applicable for initiating the combustion of the kerosene type fuels employed in gas turbine and ram jet engines. The following inspections identify the characteristics of a narrow cut kerosene preferred for use in this application as given by ANF-32 specification.

| | |
|---|---|
| A. P. I. gravity | 35° min. |
| Freezing point | —76° F. max. |
| Aromatics | 20% max. |
| Sulfur | 0.2% max. |
| Viscosity (kin.) @ —40° F | 10 max. |
| Distillating: | |
| 10% | 410° F. max. |
| 90% | 490° F. max. |
| Final | 572° F. max. |
| Flash point | 110° F. min. |
| Heating value, B. t. u./lb | 18,500 min. |

What is claimed is:

1. The method of operating ram jet and gas turbine engines normally supplied with a hydrocarbon fuel and air compressed by operation of the engine which comprises initiating combustion in said engine by introducing a stream of the said hydrocarbon fuel and oxygen gas in place of air into the combustion chamber of the engine, whereby the combustion zone is enriched in oxygen above the proportion normally present, simultaneously igniting said hydrocarbon fuel in the combustion atmosphere enriched in oxygen whereby combustion is initiated developing power to supply compressed air to said engine, and thereafter discontinuing the said introduction of oxygen to the combustion chamber and continuing normal operation of said engine with the said hydrocarbon fuel and compressed air developed by operation of the said engine.

2. The method of operating an engine normally operated at compression ratios above about 2 to 1 utilizing a hydrocarbon fuel and air compressed by operation of said engine which comprises initiating combustion in said engine by introducing a stream of the said hydrocarbon fuel and a stream of oxygen gas in place of air to the combustion zone of the engine and simultaneously igniting said streams to fluid, whereby combustion is initiated providing power to compress air for supply to said engine, and thereafter discontinuing flow of said stream of oxygen to the engine.

3. In the operation of gas turbine and ram jet engines normally operated on a hydrocarbon fuel and air compressed by operation of said engines, the improvement which comprises re-initiating combustion after blow-out at low atmospheric pressures existent at high altitudes by introducing a stream of oxygen gas in place of air to the combustion zone of the engine together with a stream of the said hydrocarbon fuel, and igniting said streams of oxygen and fuel, whereby power is developed to provide compressed air to said engines, and thereafter discontinuing flow of oxygen to said combustion zone and resuming normal operation supplying the combustion zone with compressed air and the said hydrocarbon fuel.

4. In the operation of ram jet engines normally operated at a compression ratio above about 2 to 1 utilizing a hydrocarbon fuel and compressed air provided by the speed of the ram jet engine, the improvement which comprises initiating combustion in said engine when the speed of the engine is below the value required to provide the said compression ratio by injecting a stream of oxygen gas in place of air to the combustion zone of the engine together with a stream of the said hydrocarbon fuel and igniting said streams, and thereafter discontinuing injection of the said oxygen to the combustion zone and resuming normal operation by burning the said hydrocarbon fuel in the presence of compressed air brought into the engine by the speed developed.

5. In combination with a ram jet engine, a spark plug positioned in the combustion zone of the engine, a fuel inlet into said combustion zone adjacent the spark plug, an air inlet into the combustion zone, a storage vessel containing oxygen gas, an auxiliary oxygen line connected to said storage vessel opening directly into the said combustion zone adjacent the spark plug, a valve positioned in the said oxygen line, means associated with said valve adapted to prevent flow of oxygen to the combustion zone when the spark plug is inoperative and permitting flow of oxygen to the combustion zone when the spark plug is operated.

6. In combination with a gas turbine engine, a spark plug positioned in the combustion zone of the engine, a fuel inlet into said combustion zone adjacent the spark plug, an air inlet into the combustion zone, a storage vessel containing oxygen gas, an auxiliary oxygen line connected to said storage vessel opening directly into the said combustion zone adjacent the spark plug, a valve positioned in the said oxygen line, means associated with said valve adapted to prevent flow of oxygen to the combustion zone when the spark plug is inoperative and permitting flow of oxygen to the combustion zone when the spark plug is operated.

7. The apparatus of claim 6 wherein an auxiliary valve is positioned in the said oxygen line operative at a particular barometric pressure corresponding to the atmospheric pressure existing at the altitude at which the engine is operated.

8. The apparatus of claim 5 wherein an auxiliary valve is positioned in the said oxygen line operative at a particular barometric pressure corresponding to the atmospheric pressure existing at the altitude at which the engine is operated.

HERMAN L. THWAITES.
BARRETT B. RUSSELL, 3RD.

References Cited in the file of this patent

UNITED STATES PATENTS

| Number | Name | Date |
| --- | --- | --- |
| 1,584,200 | Suplee | May 11, 1926 |
| 1,854,615 | Lasley | Apr. 19, 1932 |
| 1,879,186 | Goddard | Sept. 27, 1932 |
| 2,090,039 | Goddard | Aug. 17, 1937 |
| 2,395,403 | Goddard | Feb. 26, 1946 |
| 2,410,403 | Bodine | Nov. 5, 1946 |
| 2,465,092 | Harkness et al. | Mar. 22, 1949 |
| 2,470,564 | Lawrence et al. | May 17, 1949 |
| 2,496,502 | Steensma | Feb. 7, 1950 |
| 2,500,334 | Zucrow | Mar. 14, 1950 |
| 2,590,009 | Hannum | Mar. 18, 1952 |